US012153682B2

(12) United States Patent
Jaster

(10) Patent No.: US 12,153,682 B2
(45) Date of Patent: Nov. 26, 2024

(54) CYBER THREAT SCORING, CYBER SECURITY TRAINING AND PROACTIVE DEFENSE BY MACHINE AND HUMAN AGENTS INCENTIVIZED WITH DIGITAL ASSETS

(71) Applicant: 418 Intelligence Corp., Sterling, VA (US)

(72) Inventor: Mark Jaster, Sterling, VA (US)

(73) Assignee: 418 Intelligence Corp., Sterling, VA (US)

(*) Notice: Subject to any disclaimer, the term of this patent is extended or adjusted under 35 U.S.C. 154(b) by 0 days.

(21) Appl. No.: 17/683,088

(22) Filed: Feb. 28, 2022

(65) Prior Publication Data

US 2023/0325511 A1      Oct. 12, 2023

Related U.S. Application Data

(60) Provisional application No. 63/154,425, filed on Feb. 26, 2021.

(51) Int. Cl.
*G06F 21/57*      (2013.01)
*G06Q 20/06*      (2012.01)

(52) U.S. Cl.
CPC ......... *G06F 21/577* (2013.01); *G06Q 20/065* (2013.01)

(58) Field of Classification Search
CPC ............................ G06F 21/577; G06Q 20/065
See application file for complete search history.

(56) References Cited

U.S. PATENT DOCUMENTS

| | | | |
|---|---|---|---|
| 9,203,859 B2* | 12/2015 | Sampigethaya | H04L 63/1433 |
| 2010/0125903 A1* | 5/2010 | Devarajan | H04L 63/102 709/224 |
| 2014/0359760 A1* | 12/2014 | Gupta | H04L 63/1483 726/22 |
| 2018/0349612 A1* | 12/2018 | Harel | G06F 11/0793 |
| 2019/0379699 A1* | 12/2019 | Katragadda | H04L 63/1425 |

* cited by examiner

*Primary Examiner* — Viet D Vu
(74) *Attorney, Agent, or Firm* — LSIP Law LLC

(57) ABSTRACT

Some embodiments are directed to processor based methods and systems for addressing threats that are harmful to computer systems of users. The methods and systems perform steps that include: classifying the detected threats based on aspects of the newly detected threat that are similar to the previously detected threats; categorizing the classified, newly detected threat based on estimated techniques for mitigating the classified, newly detected threat; storing the categorized, classified, newly detected threats to threat library; enabling the community of mitigation and assessment agents to access the stored, categorized, classified, newly detected threat and to provide mitigation and assessment information for mitigating the categorized, classified, newly detected threat; determining relevancy of the provided mitigation information to assign a relative skill level rating of the mitigation and assessment agents; and identifying at least one of the mitigation and assessment agents most capable of handling the newly detected threat, based on the assigned skill level.

19 Claims, 5 Drawing Sheets

CYBER THREAT SCORING, CYBER SECURITY TRAINING AND PROACTIVE DEFENSE BY MACHINE AND HUMAN AGENTS INCENTIVIZED WITH DIGITAL ASSETS

RELATED APPLICATION

This application claims priority to U.S. Provisional Patent Application No. 64/154,425 filed on Feb. 26, 2021, the entirety of which is incorporated herein by reference.

BACKGROUND

Some embodiments relate to cyber threat scoring, cyber security training and proactive defense by human and machine agents incentivized with digital assets.

Cybercrime and/or computer-based crime is becoming increasingly important as more value is aggregated in electronic artifacts such as financial accounts and databases. Corporations and other organizations are vulnerable to a variety of threats. If a threat is actualized in the form of an attack, the organization may lose considerable value. Attacks can result in a direct loss of money, loss of confidential information which later can be monetized, loss of infrastructure availability, loss of data integrity, loss of customer confidence, loss of brand value, and other losses. As tactics for thwarting and parrying attacks are developed and implemented by organizations, new attacks are devised and attempted by bad actors.

SUMMARY

There is a shortage of cyber security solutions that are proactive in identifying new threats and allowing end users to shut them out or close them down. While some capabilities exist, the present method discloses a tool that will close this gap and maintain significant revenues across many sectors that are susceptible to cyber-crimes.

Some embodiments relate to methods for scoring a threat, training agents and defending proactively by human and machine agents incentivized with digital assets.

Some other embodiments relate to establishing a pipeline to detect and mitigate threats. System is equipped to score threats using Bayesian infrastructure, categorize the threats using MITRE framework, store threats and related mitigation actions in the threat library. System is also equipped to train human and machine agents by curating, assessing, and scoring live threats. System is also equipped to create cyber intelligence with human and machine agents using human in the loop Machine Learning. System is configured to incentivize agents with digital and traditional assets to enrich the threat library and analyze the agents with respect their talent level. System is also configured to orchestrate a response to live threats by forwarding agents to fill talent gaps or by a machine agent that utilizes the threat library.

First set of embodiments are directed to a processor based system for addressing threats that are harmful to computer systems of users. The system can be usable with a community of mitigation agents upon detection of the threats. The threats include a newly detected threat and previously detected threats. The system can be configured to perform steps including: classifying the detected threats based on aspects of the newly detected threat that are similar to the previously detected threats; categorizing the classified, newly detected threat based on estimated techniques for mitigating the classified, newly detected threat; storing the categorized, classified, newly detected threats to threat library; enabling the community of mitigation agents to access the stored, categorized, classified, newly detected threat and to provide mitigation information for mitigating the categorized, classified, newly detected threat; determining relevancy of the provided mitigation information to assign a relative skill level rating of the mitigation agents; and identifying at least one of the mitigation agents most capable of handling the newly detected threat, based on the assigned skill level.

In some embodiments, the step of classifying the newly detected threat further includes classification matching the newly detected threats to either human skills or analytical tools that may be required to fully detect the threat's infiltration, to remediate or to manage the threat.

In some embodiments, the step of classifying the newly detected threat further includes classification matching to a previously stored threat to and relevant mitigation techniques relevant to the newly detected threat.

In some embodiments, the step of classifying the newly detected threat further includes classifying newly detected threats with respect to its carriers, payload, event information with details from a standardized ontology.

In some embodiments, the step of classifying a newly detected threat further includes creation and curation of nodes that are based on the standardized ontology which has the benefit of describing a newly detected threat's components and outcomes.

In some embodiments, nodes are connected in a Bayesian network that predicts and estimates information contained within the network.

In some embodiments, the step of classifying the detected threat further includes utilizing the system's stored mitigation information to stop the progression of a threat.

In some embodiments, the categorization of a newly detected, classified threat further includes transmitting an interactive graph-based report by the system that guides in categorization of threats.

In some embodiments, the step of enabling the community of mitigation agents to access threats includes automating private access to appropriate resources remotely and rapidly to implement the mitigation entity on a newly detected threat.

In some embodiments, the step of determining relevancy of the provided mitigation information to assign a relative skill level rating of the mitigation agents further includes scoring mitigation agents based on the time spent, time to mitigate key attributes of the threat and aggregated historical success of agents mitigating the threat.

In some embodiments, the step of determining the relevancy of information provided by mitigation agents further includes scoring of the information provided using a Brier scoring algorithm that considers the novelty of the threat the mitigation agent is mitigating.

Some embodiments further include training mitigation agents by utilizing the threat library to create interactive instructions based on specific learning objectives or skills to address specific mitigation techniques that were categorized earlier by the system.

In some embodiments, mitigation agents can be trained in groups.

Some embodiments further include incentivizing mitigation agents with monetary rewards.

In some embodiments, monetary rewards are delivered via traditional methods.

In some embodiments, monetary rewards are delivered in digital formats such as a crypto token issued by the system and allow mitigation agents and users of the system to exchange their tokens on the system interface.

Some embodiments further include establishing an exchange market for detecting and mitigating threats wherein mitigation agents are monetarily rewarded with respect to the novelty of the information they provide wherein value of the information is determined by other mitigation agents of the system.

In some embodiments, the step of storing a categorized, classified, newly detected threat can occur in Non-Fungible Token format or a similar blockchain enabled digital instrument on a decentralized server with a smart contract which enables the threat and relevant mitigation technique information to be purchased.

In some embodiments, each storage of a threat in NFT format or similar blockchain enabled digital instrument on a decentralized server with a smart contract enables marketplace members to own shares in the information that yield dividends or other payouts as it is subsequently sold.

In some embodiments, the detection of a threat occurs automatically by the system.

Second set of embodiments are directed to a processor based system for addressing threats that are harmful to computer systems of users. The system can be usable with a community of assessment and mitigation agents upon detection of the threats. The threats include a newly detected threat and previously detected threats. The system can be configured to perform steps including: classifying the detected threats based on aspects of the newly detected threat that are similar to the previously detected threats; categorizing the classified, newly detected threat based on predicted techniques for assessing the classified, newly detected threat; storing the categorized, classified, newly detected threats to threat library; enabling the community of mitigation and assessment agents to access the stored, categorized, classified, newly detected threat and to provide assessment information for assessing the categorized, classified, newly detected threat; determining relevancy of the provided assessment information to assign a relative skill level rating of the assessment agents; and identifying at least one of the assessment agents most capable of handling the newly detected threat, based on the assigned skill level.

In some embodiments, the step of classifying the newly detected threat further includes classification matching to a previously stored threat and analytics relevant to the newly detected threat.

In some embodiments, the step of classifying a newly detected threat further includes creation and curation of nodes in an information model representing the threat that are based on the standardized ontology, describing a newly detected threat's components and outcomes.

In some embodiments, the step of classifying the newly detected threat further includes utilizing the system's stored analytics and mitigation information to hypothecate on alternative scenarios relating to the prosecution of a threat.

In some embodiments, the step of classifying the newly detected threat further includes utilizing the system's stored analytics and mitigation information to hypothecate on alternative scenarios relating to the prosecution of a threat.

In some embodiments, the step of classifying the newly detected threat further includes hypothecation of feasible scenarios of a threat by a graph-based interactive algorithm and data visualization to interactively guide classification of threats by exploring matches of emerging findings and hypothetical variations represented as sets of nodes with models from previously detected threats and correlations between nodes from threat library to recommend lines of analysis regarding the newly detected threat.

In some embodiments, the step of hypothecating feasible scenarios of a threat includes utilizing Bayesian conditional probabilities.

In some embodiments, the step of hypothecating feasible scenarios of a threat includes utilizing historical data collected from mitigation and assessment information provided by mitigation and assessment agents.

In some embodiments, the step of categorization of a newly detected, classified threat further includes transmitting an interactive graph-based report by the system that guides in categorization and analysis of threats.

In some embodiments, mitigation and assessment agents can be trained in groups.

In some embodiments, the step of enabling the community of assessment and mitigation agents to access threats includes automating private access to appropriate resources remotely and rapidly to implement the analytics and mitigation entities on a newly detected threat.

In some embodiments, the step of determining relevancy of the provided analytics and mitigation information to assign a relative skill level rating of the assessment and mitigation agents further includes scoring mitigation and assessment agents based on the time spent, and effectiveness in the assessment and mitigation of key attributes of the threat and aggregated historical success of agents analyzing and mitigating the threat.

In some embodiments, the step of determining the relevancy of information provided by mitigation and assessment agents further includes scoring of the information provided and its source using a Brier scoring algorithm that considers the novelty of the threat the assessment and mitigation agent is mitigating and assessing.

In some embodiments, the step of determining the relevancy of information provided by mitigation and assessment agents further includes quantifying individual contribution to threat assessment and mitigation from team collaboration.

The system in claim 1, further comprising training of mitigation and assessment agents by utilizing the threat library to create interactive lessons and instructions based on specific learning objectives or skills to address specific analysis and mitigation techniques that were categorized earlier by the system.

Some embodiments further include training of mitigation and assessment agents by utilizing the threat library to create interactive lessons and instructions based on specific analysis and mitigation skills.

Some embodiments further include incentivizing mitigation and assessment agents with monetary and reputational rewards.

Some embodiments further include incentivizing mitigation and assessment agents with experiential rewards.

Some embodiments further include incentivizing mitigation and assessment agents with game economy and reputational rewards.

Some embodiments further include establishing an exchange market for detecting and mitigating threats wherein mitigation and assessment agents are monetarily rewarded with respect to the novelty of the information they provide wherein value of the information is determined by other mitigation and assessment agents of the system.

In some embodiments, the step of storing a categorized, classified, newly detected threat further includes storing any information collected by the system during the assessment and mitigation of the newly detected threat.

In some embodiments, the step of storing a threat in Non-Fungible token format or similar blockchain enabled digital instrument on a decentralized server with a smart contract which enables the threat and relevant mitigation technique information to be purchased applies to previously detected threats.

In some embodiments, each storage of a threat in NFT format or similar blockchain enabled digital instrument on a decentralized server with a smart contract enables marketplace members to own shares in the information and its derivatives that yield dividends or other payouts as it is subsequently sold.

Some embodiments further include issuing a new class of crypto currency whose units are minted through intellectual work that provides information having the recognizable value of removing uncertainty in any domain of knowledge in which removing uncertainty is valued.

In some embodiments, the detection of a threat occurs manually by users of the system.

In some embodiments, the detection of a threat occurs as a result of hypothecation of a threat by users of the system.

BRIEF DESCRIPTIONS OF FIGURES

Each figure describes basic features of various methods and apparatuses for cyber threat scoring, cyber security training and proactive defense by machine and human agents incentivized with digital assets. Various exemplary aspects of the systems and methods will be described in detail, with reference to the following figures, wherein.

Figure 2A:
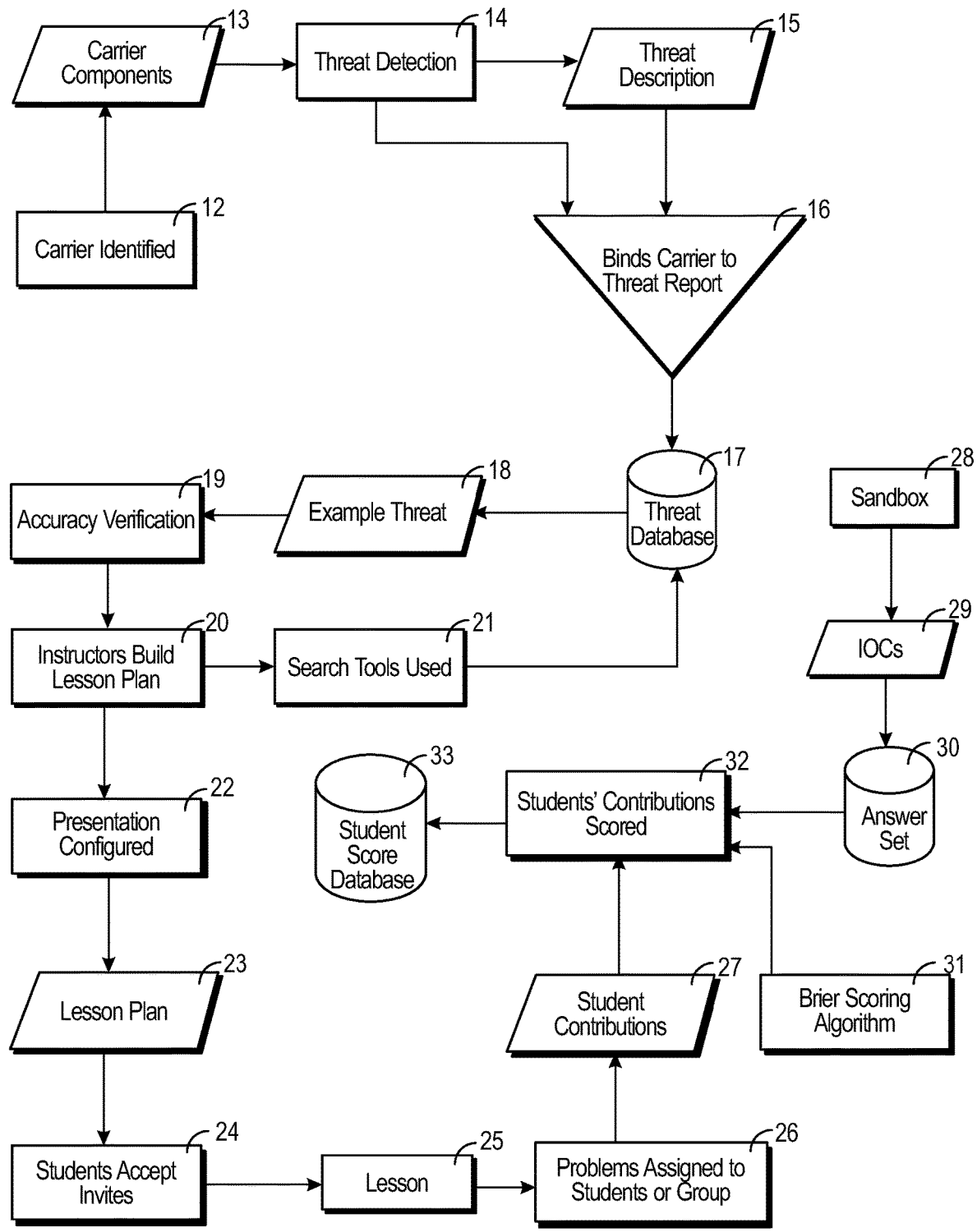
FIG. 2a is a flowchart showing how live threats are curated and scored for cyber training.
Figure 2B:
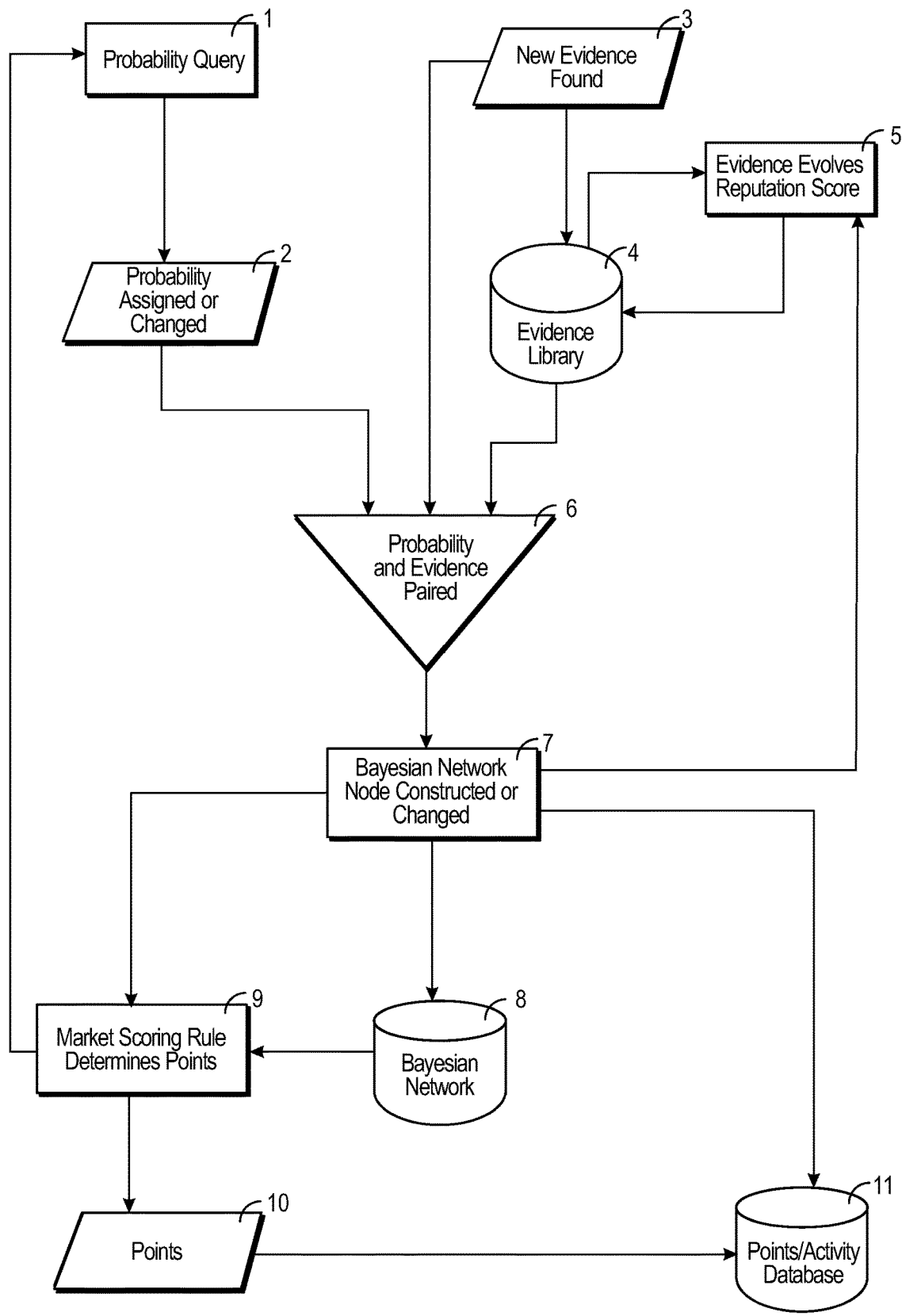

FIG. 2b a flowchart showing how human and machine agents interact to create collective and predictive intelligence.

Figure 3:
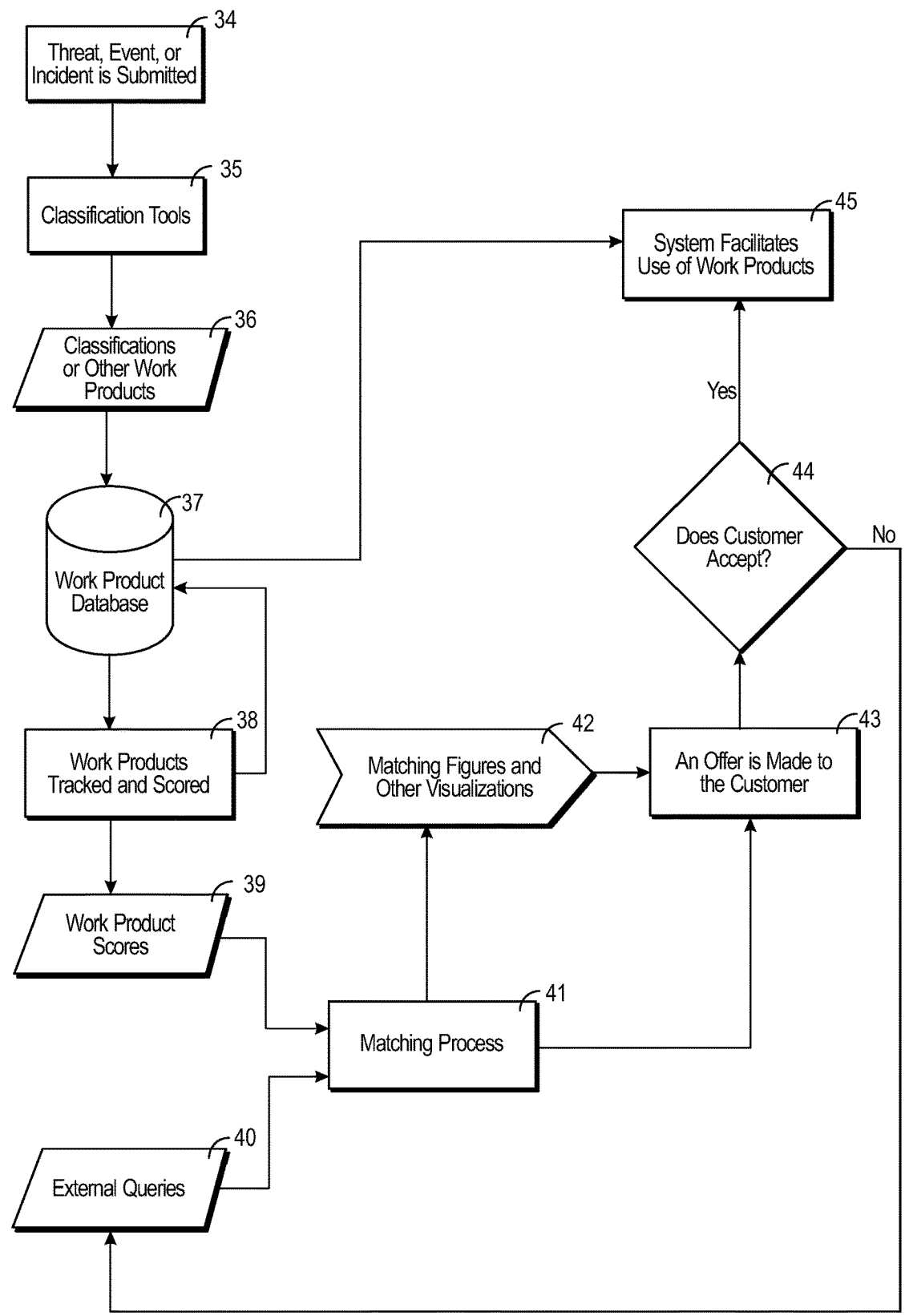

FIG. 3 is a flowchart showing how system orchestrates investigations and mitigation responses to various threats.

Figure 4:
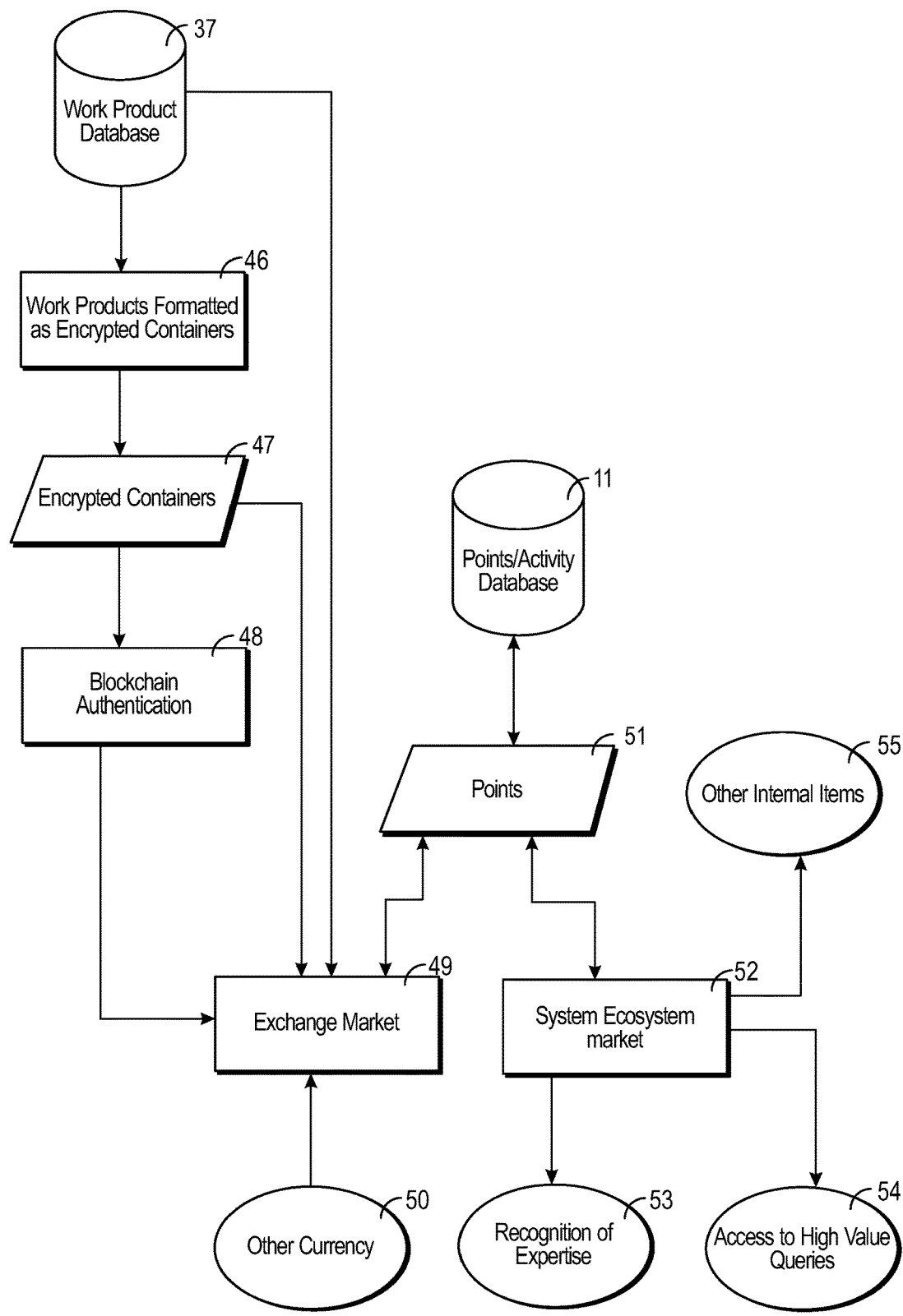

FIG. 4 is a flowchart showing how agents are incentivized by digital assets.

DETAILED DESCRIPTION

I. Definitions

Exemplary embodiments are intended to cover all software or computer programs capable of performing the various heretofore-disclosed determinations, calculations, etc., for the disclosed purposes. For example, exemplary embodiments are intended to cover all software or computer programs capable of enabling processors to implement the disclosed processes. In other words, exemplary embodiments are intended to cover all systems and processes that configure a document operating system to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or subnetworks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

The client and server devices are intended to include or otherwise cover all software or computer programs capable of performing the various heretofore-disclosed determinations, calculations, etc., for the disclosed purposes. For example, exemplary embodiments are intended to cover all software or computer programs capable of enabling processors to implement the disclosed processes.

These and other features and advantages are described in, or are apparent from, the following detailed description of various exemplary embodiments. Before embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

It will be understood that when an element is referred to as being "on", "connected", or "coupled" to another element, it can be directly on, connected, or coupled to the other element or intervening elements that may be present. In contrast, when an element is referred to as being "directly on", "directly connected", or "directly coupled" to another element, there are no intervening elements present. As used herein the term "and/or" includes any and all combinations of one or more of the associated listing items. Further, it will be understood that when a layer is referred to as being "under" another layer, it can be directly under, or one or more intervening layers may also be present. In addition, it will also be understood that when a layer is referred to as being "between" two layers, it can be the only layer between the two layers, or one or more intervening layers may also be present.

It will be understood that, although the terms "first", "second", etc. may be used herein to describe various elements, components, regions, layers, and/or sections, these elements, components, regions, layers and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of exemplary embodiments.

In the drawing figures, the dimensions of layers and regions may be exaggerated for clarity of illustration. Like reference numerals refer to like elements throughout. The same reference numbers indicate the same components throughout the specification.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the platform in use or operation in addition to the orientation depicted in the figures. For exemplary, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized embodiments (and intermediate structures) of exemplary embodiments. As such, variations from the shapes of the illustrations as a result, for exemplary, of manufacturing techniques and/or tolerances, are to be expected. Thus, exemplary embodiments should not be construed as limited to the particular shapes of regions illustrated herein but are to include deviations in shapes that result, for exemplary, from manufacturing. For exemplary, an implanted region illustrated as a rectangle will, typically, have rounded or curved features and/or a gradient of implant concentration at its edges rather than a binary change from implanted to non-implanted region. Likewise, a buried region formed by the implantation may result in some implantation in the region between the buried region and the surface through which the implantation takes place. Thus, the regions illustrated in the figures are schematic in nature and their shapes are not intended to illustrate the actual shape of a region of a device and are not intended to limit to scope of exemplary embodiments.

Unless otherwise defined, all terms (including technical and scientific terms) used herein have the same meaning as commonly understood by one of ordinary skill in the art to which exemplary embodiments belong. It will be further understood that all terms, such as those defined in commonly used dictionaries, should be interpreted as having a meaning that is consistent with their meaning in the context of the relevant art and will not be interpreted in an idealized or overly formal sense unless expressly so defined herein. As used herein, expressions such as "at least one of", when preceding a list of elements, modify the entire list of elements and do not modify the individual elements of the list.

When the terms "about" or "substantially" are used in this specification in connection with numerical values, it is intended that the associated numerical value include a tolerance of ±10% around the stated numerical value. Moreover, when reference is made to percentages in this specification, it is intended that those percentages are based on weight, i.e., weight percentages. The expression "up to" includes amounts of zero to the expressed upper limit and all values therebetween. When ranges are specified, the range includes all values there between such as increments of 0.1%. Moreover, when the words "generally" and "substantially" are used in connection with geometric shapes, it is intended that the precision of the geometric shape is not required but that latitude for the shape is within the scope of the disclosure. Although the tubular elements of the embodiments may be cylindrical, other tubular cross-sectional forms are contemplated, such as square, rectangular, oval, triangular, and others.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For exemplary, when a device structure (e.g., a memory cell structure or transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Reference will now be made in detail to embodiments, exemplary of which are illustrated in the accompanying drawings, wherein like reference numerals refer to the like elements throughout. In this regard, the present embodiments may have different forms and should not be construed as being limited to the descriptions set forth herein. There may be applications of these embodiments in different fields other than cybersecurity, wherein a threat or an event may exist, agents are trained and incentivized to find solutions. Some of these applications may include but not limited to; portfolio management, drug discovery, clinical trials and so forth. Accordingly, the embodiments are merely described below, by referring to the figures, to explain exemplary embodiments of the present description, which is divided into the following sections.

II. Overview

Exemplary embodiments relate to methods and apparatus for cyber threat and event detection, analysis and mitigation methods that address the foregoing problem by using the technical solutions, including: receiving threat information; and sending the threat information to a system to score and categorize threat, train agents by simulating live threats, train computer agents by reinforcement learning, train a collection of both human and machine agents by human in the loop ML, store mitigation methods to threat library, incentivize agents with digital assets to bolster the library, orchestrate a defense against live threats by forwarding human agents to fill talent gap or computer agents that utilizes the library.

Figure 1:
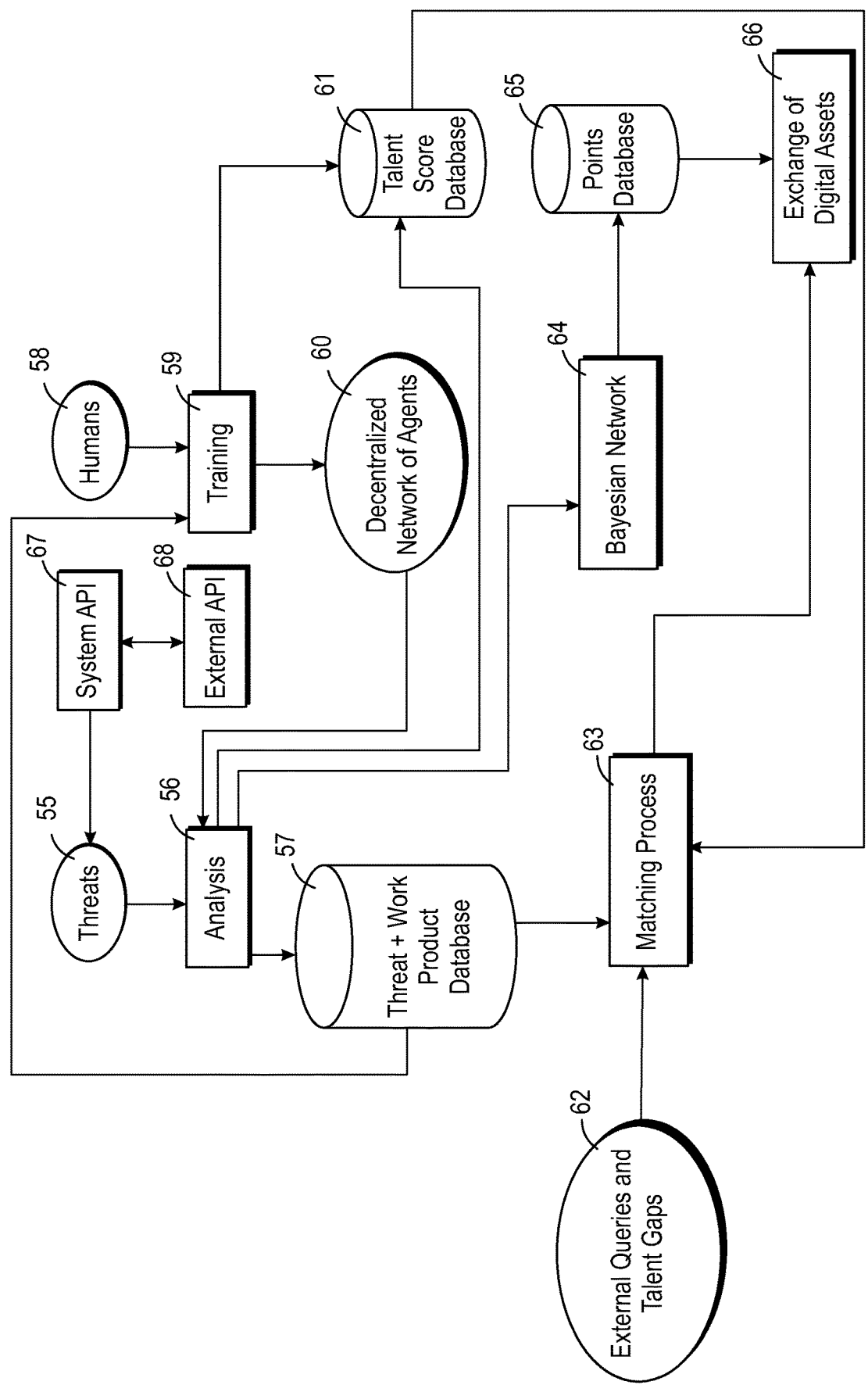
FIG. 1 is a flowchart showing the overall purpose of the invention.

FIG. 1 is a flowchart showing the overall purpose of the invention.

Starting from module 67, the platform may be equipped to ingest threats via application programming interface and also from external parties as seen in module 68. In the event that these threats or events are received, system is designed to anonymize the information received from external parties before proceeding with the analysis, investigation and deconstruction of such threats and events.

Moving onto module 55, the platform is equipped to receive, ingest, anonymize reversibly, analyze, detect and score live threats and events provided by automated analytical systems or a manual user upload option. The platform can also enable the use of any source that can trigger a threat or an event: a sensor, an AI detection system, an individual analyst, or the system itself as mentioned above.

The platform is designed to detect, graphically model, and predict event flows and outcomes, for the purpose of guiding response to and/or remediating attacks against computer systems, malware (e.g., computer virus infection, phishing, spyware, computer worms and other existent and future techniques for compromising or effecting surveillance of computer system(s) and/or inflicting damage to such systems.

The platform is designed to facilitate an analysis that further aims to investigate threats by humans and analytical technologies as seen in module 56. The system initially compares identified fragments of threat or event artifacts to its novel existent threat library. In the case of a match of any degree between a threat or event pattern to an existent threat model, the model is applied for the full extent of the infiltration with curated detection, analysis and remediation methods. In the case of a non-matching or novel threat or event, the system is equipped to predict the optimal actions to take to facilitate a further analysis to classify such threat or event.

During this analysis, the identity of the carrier and the method to access it is sent to the system for investigation. The automated analytical system may reside on an external system that is either being used to analyze the threat in the service of the facilitating system or that is the original source or referrer of the threat carrier.

The analysis of the threat consists of associating contextual information found on the threat with the carrier, store that information in threat library and make the contextual information available to authorized users for training purposes.

The threat library may be designed to store past threats and defense mechanisms including relational tables and objects of real-world cyber-attacks that can later be used by agents of the system to predictively guide hunting and converge on situational awareness, cyber analysis objectives, risk assessments and defensive playbooks fast as seen in module 57.

This not only aids experienced cyber agents in being more efficient but guides new agents to the field in rapidly assimilating the collective knowledge of the cyber researcher community. Therefore, the analysis facilitation system is an important step in providing search tools to find specific threat entities and carriers possessing threat attributes that match specific learning objectives as seen in module 59.

The analysis of certain threats and work products also contain scoring and categorizing of threats that will be later used to determine the novelty and value of information provided by the agents of the system. The system is designed such that every input which contains a judgment on the probability or ultimate outcome of a threat node or piece of information contained within the system requires the exchange of points or any other reward system that the system may adopt by the Market Scoring Rule Method. The cost in points of an input is based upon the node's probability at the time of the input in keeping with the Market Scoring Rule's differential binomial distribution calculation as seen in module 64.

The platform is also designed to train agents through simulation and live threats, create a decentralized network of agents incentivized by traditional or digital assets and an automated response system to live threats by forwarding agents that fill in certain talent or skill gap required for each specific threat as seen in module 60.

The platform is equipped to score the agents of the system through scoring historical accomplishments to judge inputs and talent as seen in module 65, and to compare talent to human and machine benchmarks solving the same or similar problems. The training platform enables assigning a threat carrier to a group of analysts to analyze as a team and facilitates cloning the carrier and assigning these to individual users to develop individual's skills while automatically grading agents' answers on threat categories. The system also automatically scores the agents' input using a Brier Score algorithm (a binary scoring system of critical thinking and judgement) and it accumulates performance by threat category as seen in module 61. Live data scores can be later combined with canned simulations and labs to provide a complete picture of an agent's skill set.

The platform is also designed to incentivize agents through monetary rewards and incentives such as game economy payoffs and industry recognized digital badges for successful threat intervention by either the human analyst and/or a machine learning algorithm to provide a means of further enriching the utility of the system and characterizing the skill of the agent in providing and performing their interventions. Scoring can be further characterized by time spent, time to defeat key attributes of the threat. The platform is also designed to facilitate exchange of assets that are rewarded by the system as seen in module 66.

The platform is also equipped to respond to threats received by external parties. When a threat, event or incident is submitted to the agents of the system and the system itself, an investigation unfolds the specific classifiers, detection methods, responses and mitigations associated with the specific threat, event or incident are captured, recorded in the threat library.

In the case where a solution offered by the system to a submitted event is accepted by the external parties requesting such solutions, the platform is equipped to forward agents skilled in the solution, or exclusively authorized to implement it, by utilizing the agent scoring database constructed earlier in order to orchestrate a defense that will ultimately respond to the specific threat or event received by the external party as seen in module 63.

III. Cyber Threat Detecting, Scoring and Categorizing

Some embodiments relate to a general-purpose evidence-based method to guide cyberattack analysis and hunting objectives for use in human and machine-based investigations. The method embodies an ontological model, which may come partially from external sources, that decomposes the known methods attackers use in compromising target systems into a structured information model designed to capture one-to-many relationships exhaustively between identifiable atomic-level methods and or artifacts of compromise and higher order or correlated factors that make analysis more efficient, effective, conclusive and informative and where such relational objects and factors are then convoluted back upon themselves in the course of investigations based on situational inputs and up-to date observational relationships to elucidate analysis and reach more correct and speedy findings.

Some embodiments are related to enabling human and synthetic intellects to collaborate as peers in complex problem solving where judgment under uncertainty is the principal measurement of success. The value of the system increases when multiple skills or sensor sources, potentially on multiple pieces of a bigger information model, and the timeliness of information are important to outcomes.

Some embodiments are related to facilitating the collaboration and estimation of important figures-of-merit such as related to risk assessments or progression of event flows through a dynamically constructed and editable conditional probability model (a Bayes Net) in an inference engine that uses incentives based on submitting information with intrinsic and extrinsic value to elicit the probabilities of predictions, or beliefs, for nodes of a Bayes Net.

Some embodiments may feature an extensible cyberattack library that models knowledge to such a degree that operators possessing highly sensitive information can share that knowledge in an operationally meaningful format with users in lower sensitivity contexts without disclosing information which might be sensitive.

Cyberattack library may be designed to store past threats and defense mechanisms including in relational tables, data graphs and objects extracted from real-world cyber-attacks that can later be used by agents using the system to predictively guide hunting and efficiently converge on situational awareness, cyber analysis objectives, risk assessments and defensive playbooks. This not only aids experienced cyber agents in being more efficient but keeps them informed continuously and guides new agents to the field in rapidly assimilating the collective knowledge of the cyber researcher community.

In some embodiments, the system can make use of machine learning methods, such as anomaly detection, which can then later inform the nodes and the higher order outcomes that a particular outlier pattern may suggest. When other information is brought to bear from other sensors or from users, the detector's reinforcement learning capabilities could refine its prediction. Using the system, the final determination of all questions of a scenario that occurs in the platforms' adjudication and settlement process can add to the ML's training corpus and hence the cyberattack library.

In the case of cyber threat hunting and response the system uses this dynamic and explicit architecture and certain relational or graph-analytic methods in wiring together the elements of an information framework describing cyberattacks and defenses such as MITRE Corporation's ATT&CK framework (its Adversary Groups, Adversary Software, Tactics, Techniques, Impacts, Detection Methods and Mitigation Methods) to decompose and construct cyberattacks into coherent models. These models are useful in predicting answers to both high level questions like which campaign playbook an attacker is using and which defenses are best against it, as well as to specific tactical questions like what methods should an analyst hunt for next given what is known, what has been observed in the entire recorded dataset of prior attacks, what deserves special attention and what may be hypothesized to reduce the possibilities as well as to leverage predictive modeling to provide further actionable insights into cyberattack events.

Some embodiments in the system streamline a cybersecurity process by crowdsourcing agents, training the agents with a combination of human and machine intelligence and facilitating the agents to then focus on the models themselves to capture the essence of their thinking in conditional event driven probability inference models that build on-the-fly to guide cyber rookies to the same outcomes as seasoned experts. This enables the system to encapsulate expertise at scale and connect users across dimensions such as differing organizational sophistications and distance to fill specific talent gaps on-demand to address even time-critical needs and incentivize leading-edge talent or analytics tools to drop directly into a case.

In some embodiments, it may be possible for the system to normalize and anonymize data as it is shared with the authorized users of a case.

The system affords human agents with the ability to collaborate with and to facilitate learning from each other faster; moreover, the system provides tools to access emerging best practices from the growing open-source community.

In some embodiments, the system provides a computational means by which it can 'suggest' hypotheses in order to facilitate effective hunting and response by applying expert system logic to graphically depict and record attack playbooks, potential effects and response options.

Some embodiments may feature a method whereby convolutions of the relational objects of one-method-to many-factors with each other and with the observational relationships of the factors back to the methods and to each other are used to find matches between the information entities and are performed recursively based on strings of the attacker methods and of the factors.

Some embodiments may feature a method whereby the outputs of the convolutions are filtered by selected factors or combinations of factors to narrow the set of matches for focus or to evaluate analytical hypotheses.

Some embodiments may feature a method whereby the factors can be prioritized through a specified property for investigational attention because of risk or some other similar reason for attention, and whereby the value of these properties are used to augment and accumulate investigational objectives so as to not converge an analysis too narrowly or prematurely.

Some embodiments may feature a method for the detection and management of cybersecurity attacks that incorporates MITRE Corporation's ATT&CK framework (its Adversary Groups, Adversary Software, Tactics, Techniques, Impacts, Detection Methods and Mitigation Methods) into nodes in this probability modeling system and added to them other important concepts in Risk Assessment, Vulnerabilities Assessment, Target Assessment, and Attacker Playbooks. This system attaches free-form data objects to each node that are designed to capture useful information on a node, such as contextual "bread crumbs" through a case history, and to capture both new universal methods useful to defenders, such as detection analytics and controls, and evidence specific to a case, such as of attacker activity in host or network data.

Some embodiments may feature graphical representations of strings of methods and lists of factors, and interfaces with such graphical representations to interact with the use of the system's methods and information tools to efficiently aid agents and decision makers in learning and practicing how to analyze and hunt threats and how to elucidate and manage investigational priorities imparting a high level of insight and situational awareness on the user.

The relational factors include but are not limited to: higher order adversary objectives which may be tactical or strategic including intended or observed impacts, identifiable software packages containing or executing the methods which have known or bounded properties and mitigation strategies, known adversary groups or organizations, known vulnerabilities in systems that affect the application of the methods and their severities of impact, specific technologies or classes of technologies or networks of systems or organizations that may affect how attacks progress or their outcomes, combinations of these factors and methods in recognizable orchestrations such as "playbooks", and methods of defenders and defensive tools in detecting, mitigating or proactively preventing the methods or how they are used from having effect.

Using graphical representations and predictive modeling, the system augments human efforts with machines and fosters innovations such as attack graphs to model defense and machine learning models of attack paths to inform defenses of potential weaknesses or to proactively improve network designs.

In some embodiments, the system may use MITRE ATT&CK based Bayes Net infrastructure with predictive attack graph automation that has been designed to reveal and suggest possible attack playbooks as inputs from users or sensors inform its rules. The visualization quickly shows human users the totality of the tactical situation, as well as the specific information gaps needing attention (e.g. high-uncertainty or high-criticality nodes on the graph) and the potential strategic implications of the situation such as the probability of impacts and of risks to assets. Both humans and machines can use this information to search and report findings while removing uncertainty and automatically adjusting the conditional probabilities.

In some embodiments, the platform can accelerate teaming between humans and machines and effectiveness of the total system. First, the platform can enable the use of any source that can trigger an event such as a sensor, an AI, an individual agent or the system itself. When such a trigger is identified, whether by the system or by a user, the platform activates a set of attacker methods and risk factors it knows to assess that typically accompany the kind of trigger event that has been identified. Cyber technology developments like anomaly or behavioral detections can automatically activate all the related TTPs (Tactics, Techniques and Procedures of cyber threats) known to follow such an event for analysts to hunt. These may include vulnerabilities or factors that are most critical and risky such as trending or particularly damaging attacker software or adversary groups. The platform end-user can see that it has identified the vulnerabilities or risk factors and the associated TTPs, so that defenders have a game plan to follow.

In some embodiments, the platform may provide the agent with specific insights into why each node has been activated and hence, tells the agent exactly what to look for and why the threat information and corresponding vulnerabilities were identified. The tool uses the data it collects to model the situation users will face from the attack, along with the situations and attacks they may face next. This transparency into the machine's own analytic method allows for rapid sharing not only of the analytic assessments, but the process itself, which in turn allows for predictive, collaborative efforts across multiple users and teams. One of the advantages the methods provide is the ability to orchestrate a response quickly and accurately to a cyberattack; leveraging a de-centralized workforce comprising both human and machine agents.

FIG. 2a is a flowchart how live threats are curated and scored for cyber training.

Threat detection is initiated after a carrier of a threat or the artifacts of a threat captured when it was present in a system is identified for investigation, and that carrier or artifact entity is one that can be accessed or made available for investigation. This can be seen in module 12. In one embodiment the carrier is a URL contained within a phishing email or hosted online and accessible over the internet which hosts a threat. In another embodiment, it is a document distributed or downloaded to victims to be opened by users. In another embodiment it is a digital binary record such as an image of a computer's resources and operating configuration at a point in time. In another embodiment, it is a record of the history of the network traffic that occurred on a computer network, or it is recordings such as system log files of activities occurring on the systems associated with computer network and the host computers of the network.

The identity of the carrier and the method to access it is sent to a system designed to investigate threats and to facilitate analysis by humans and analytical technologies as can be seen in module 12.

The system separates the carrier into its component parts as can be seen in 13, some of which may be benign and commonplace for communications purposes, some which may contain the malicious code or methods, and some which may contain instructions or relevant metadata the threat needs to operate as designed.

Within those parts a threat is detected or identified by an automated analytical system in module 14. The automated analytical system may reside on the system designed to facilitate analysis, or it may reside on an external system that is either being used to analyze the threat in the service of the facilitating system or that is the original source or referrer of the threat carrier. In one embodiment a malware threat is detected by a malware sandbox, which is a system designed to execute programs and observe the behaviors that occur on the system and identify those which are malicious. In another embodiment a URL sandbox is used to investigate a URL server, its assets and its interactions with a browser of the sandbox interacting with the URL. Such a URL sandbox may capture files being downloaded by the URL and make those files available for analysis by a malware sandbox. Two common embodiments where the automated analytical system is the original source of the threat carrier are systems called Endpoint Detection and Response (EDR) technologies and Intrusion Detection Systems (IDS).

The automated analytical system describes the threat in contextual terms and categories of common concepts and reports on these findings in records associated with the threat.

In one embodiment malware are detected by anti-virus technologies by matching the code to specific programming techniques called signatures of a particular malware species. In another embodiment a malware or URL sandbox identifies Indicators of Compromise (IOCs) which are records left behind or metadata exposed by the threat itself or as it performs its functions and that are intrinsically indicative of an abnormal condition or that have been reported already to be malicious by some authoritative source(s).

In another embodiment systems or technologies identify computer vulnerabilities that may be found in artifacts being analyzed or found by associating vulnerabilities of note with methods in use by the threat. In another embodiment search or detection programs such as scripts are reported by the sandbox tools. In another embodiment the findings represent discrete identifiable techniques used by malicious actors, and a specific sub-embodiment of this type commonly used in the field of cybersecurity is the tactics, techniques, and procedures of cyberattacks contained within the MITRE Corporation ATT&CK framework. In another embodiment cyberattack campaigns known to experts in the field and classes of attacks, such as ransomware and software supply chain, are identified.

The system facilitating the analysis binds the carrier to the threat report in module 16, so that the identity of the carrier can be used to find it wherever it may exist in the world at any point in time.

Moving now to module 17, the threat is recorded in the cyber-attack library.

The analysis facilitation and orchestration system associates the contextual information found on the threat in module 15 with the carrier, stores that information in the database and makes that contextual information immediately available to authorized users such as instructors to find carriers of threats possessing specific attributes associated with a learning objective or lesson. In one embodiment the learning objectives are one or more of the various Tactics, Techniques, Procedures and Software of the MITRE ATT&CK framework. In another embodiment the learning objectives are attack campaigns or attack classes like ransomware. In another the learning objectives are detecting the evidence of specific adversaries.

Wherever correlations are captured between meaningful threat attributes like a reported malware signature or MITRE technique to IOCs that a student could be expected to find as evidence of the presence of the attributes, these correlations are stored in the database.

The analysis facilitation system then provides information search tools to find specific threat entities and carriers possessing threat attributes that match specific learning objectives.

Settings are exposed to the users and forms, and automated content management systems are used to configure the content and how the threat and its carrier will be presented to students. In one embodiment the settings are designed to hide the threat attribute information from view of students and the analysis facilitation system is designed to implement this control in order to prevent students from knowing what to investigate and the answers that will earn them the credit or any other digital incentivization. In another embodiment the system enables attaching time deadlines and incentives to detecting a threat. Incentives may include prizes or badges and recognition of analysts that can be added to their profile.

The analysis facilitation system makes tools available for expert instructors to verify the accuracy of the attributes reported present on the live threat to decide which threats and carriers to use for a lesson as seen in module 19.

The system enables instructors to add the carrier entities to a lesson plan they are developing in module 20 and the analysis facilitation system enables instructors to invite specific students, classes or groups to who are users in the system to receive an invitation to analyze the entity within their account.

The system enables assigning a threat carrier to a group of users to analyze as a team and facilitates cloning the carrier and assigning these to individual users to develop individual's skills as seen in module 26.

The system enables capturing IOCs from sandbox systems in an answer set only users with administrative or super administrative privileges can see and associates those records with the question when it is created.

The system automatically grades the user's answers on threat categories and IOCs using the sandbox findings, and it enables admin-privileged instructors to edit the sandbox records to correct the answer sets as seen in module 32.

The system automatically scores the user's input using a Brier Score algorithm and binary scoring system and it accumulates performance by threat category as seen in module 31. In one embodiment the user is scored for skill on all threats identified as ransomware. In another embodiment the user is scored for skill on each Tactic of the MITRE ATT&CK framework. These live data scores can be combined with scores from canned simulations and labs to provide a complete picture of the user's skill set.

In some embodiments, it is possible as machine agents and human agents are tracking down the information suggested by the attack graph for the platforms' expert system to update the Bayes Net to maintain situational awareness of higher order factors like the probable Attack Objectives, Risk of Serious Breach and the most damaging attacker activities to thwart. Working with a given platform customer, the platform could develop the first library of sensitive and privileged-access attack models to disseminate the customer's knowledge to operational units and general-purpose users without disclosing sensitive intelligence.

The platforms' Bayesian Inference tool can analyze conditionality to make it easy for users to conduct correlation assessments. Using the platform, managers, and the analysts themselves, are informed where their efforts can provide the greatest benefits such as focusing on the chokepoint for a major risk. This can be tactically invaluable and isn't necessarily common knowledge to all defenders. Furthermore, the platform allows for the application of this capability to something like the ICS (industrial control) networks and informing the managers, or a protective automated response system when probabilities exceed a risk threshold; to help defeat an active cyberattack.

The system may also be equipped to accommodate the use of graph databases (e.g., Neo4j) which can be used for the storage and analysis of cyberthreat assessment and remediation data. Such systems can afford more rapid search, discovery and analysis of data than traditional SQL databases and other NoSQL data methods. Graph databases are a type of NoSQL database, created to address the limitations of relational databases. While the graph model explicitly lays out the dependencies between nodes of data, the relational model and other NoSQL database models link the data by implicit connections.

The system may also feature graphical representations that displays or reports certain figures-of-merit including but not limited to percent-of-fit and probability-of-existence directly on the representation and/or includes them within an array for machine processing.

The system may also feature an interface for humans and machines to select and track the attacker methods and factors into editable cases, where each such case has the possibility to contain as few or as many of all the methods and factors of the system and to inherit automatically their latest versions, for structured investigations and for collaboration between humans and with machines, and where such methods can also perform aggregations of findings and perform computations on such figures-of-merit as risks and probabilities of the attacker methods and factors being present.

Some embodiments may feature machine-to-machine application programming interfaces (APIs) for commonly used cybersecurity technology classes to pass the information system inputs on observed attacker methods or factors and receive recommendations back from the system to guide analytical case work by humans or machines.

Some embodiments may enable APIs to initiate and pass information to and from the system to inform it of case-specific information and whereby the system informs other system on cases as updates are made to its models and as the situational assessment of a given cyber event changes.

The platform may allow analysts to access threat library and plurality of cyber threats, some portion of which may potentially have never been observed by security analysts or systems before, or, in a case where a particular system or network is being monitored for threats, the threats include ones that are new to this context.

One real example of a class of never-before-seen threats is newly created malicious websites launched by adversaries to conduct or support cyberattacks within phishing URLs.

In one embodiment the system collects cyber threats in real-time close to the time when they first emerge in the real world and are found to be suspicious, including at least some such threats that have been observed within hours of their birth in the real world.

system has automated methods and tools to analyze the threats, and may make either of these available to integrated systems or human users.

The system further facilitates access to and interoperability with certain tools and technologies that distributed or decentralized analysts and systems may access independently of the system or may install and use locally—thus providing a way for a decentralized network of agents and systems to access threats and report results efficiently.

Within its information system the system contains one or more information ontologies to standardize the categorization, analysis, reporting and scoring of inputs, outputs and performance metrics for the purpose of communicating threats, sharing findings, insights and actions, and to score quality factors related to information and methods shared within the system, and to normalize the sources of such data efficiently across the cybersecurity community.

In one embodiment one ontology of the system is the MITRE ATT&CK and D3FEND framework.

In another embodiment one ontology of the system is the US National Institutes of Standards and Technology (NIST) Cyber Risk framework.

In another embodiment one ontology is the US National Initiative for Cybersecurity Education (NICE) Cybersecurity Workforce Framework.

The system may append information it processes such as threats, findings, insights, methods, and actions with categorical and definitional information from the ontologies said system supports and store them in threat library.

The system may do the same with information sent to the system by users, including both connected automated systems and human users, which may also be supplied with metadata properties that apply these same categorical labels a priori. Through these ontology-based methods the system thereby enables an interoperable analytical environment for hunting and analyzing cyber threats. Thus, in combination with the rest of the system, the platform allows creation a real-time information environment, enabling collaborative decentralized real-time hunting of threats that are both referred to the system and ones that are first emerging and efficiently targeted by the system for hunters to analyze.

This describes a general-purpose crowdsourced threat hunting system that can be applied in incentive-based engagement models that may reward workers based on the uniqueness, time-based value and importance of findings, such as in bounty compensation models; or may support task-based labor models that compensate based on the volume of work performed; or may support traditional employer-based labor models where compensation is based on time.

As connected systems, tools and analysts create insights and contribute information relating to the threats, the system stores the information, including judgments on the real existence of threats and on the validity of the assignments of factors (labels) from the ontologies, in modern high performance database technologies such as Data Warehouses, No-SQL, Columnar, graph, cloud solutions and relational data bases keyed by identifiers of the threats. The resulting information datasets can then be queried, normalized, flattened, pre-processed and analyzed by any of the dimensions of the ontologies to glean valuable higher order insights across the entire cybersecurity information system and for other uses such as to train machine learning algorithms.

The system is further designed to permit agents of the system to use the ontological based information system to describe and make findable the agents' discoveries and insights they have had on particular threats or on particular combinations of ontological factors (conceptually these may be considered "proto-threats", "para-threats" or "threat genomes"). These represent the "work products" of the analysts or systems.

In one embodiment users identify a set of techniques that attackers use (an array), oftentimes with other information such as malware signatures, revealing values or digital data that can be found in records of network traffic or on computer systems (so called "Indicators of Compromise"), and entities from public repositories of master data such as named vulnerabilities, and they relate this total information array to a finding from their work that matches these factors and can be proven to be present on new data through analysis of original artifacts from computer systems or the systems themselves. In such embodiment of a work product the items mentioned are supported by the system as a means to record and facilitate analysis of cyber threats.

In another embodiment, the matching work products predict the presence of particular adversaries.

In another embodiment the work products may predict particular attack campaigns to explain a threat situation, which may include, but is not limited by, particular types of ransomware, or the persistent presence of an intruder, or the likelihood that a situation will culminate in information theft or in a supply chain attack.

In another embodiment the work products result in likelihoods that an investigation of a specific incident occurring on a network is from malicious or benign causes and whether dangerous or inert. In another embodiment the work products predict the general intent of a malicious compromise.

In any of these embodiments the work products may include methods used by the creator (s) to reach their findings and/or to mitigate the impact of the threat. By applying these methods to the artifacts or systems of a new incident, the analysis and the insights of the work product can be replicated to benefit a new threat scenario.

The work products mentioned above with their descriptive arrays of ontological factors are given unique names and sequence numbers and are encapsulated in digital entities that can be found in the system by searching the system with their ontological factors.

The entities are themselves stored within the system's local version of the ontologies as new additions to the ontologies, or new variants of items present in public versions. Contained within the entities are the full model of ontological factors that are relevant to the work product, the relevant methods the analysts or systems employed to reach the findings of the work products and that may be necessary to replicate the results, and other methods that might be recommended to mitigate the threat. Also contained within the entities are codes to initiate a case in the system with the models of insights that will help a customer to benefit by guiding them from the work products to repeat their analyses. Also contained are permissions which allows a customer to use the system to investigate a threat collaboratively with the creators of the work product using their methods and insights from stored work products. In one embodiment these codes and permissions pre-authorize the analysts and systems that created the work products to join cases created by a customer invoking them upon purchasing a copy of an entity. Thus, by invoking and running a stored work product a customer can be guided by the creators' successful analyses to find conclusions more rapidly on the cause of a threat and the methods to mitigate its impacts.

IV. Collective and Predictive Intelligence from a Plurality of Human and Machine Agents FIG. 2b is a flowchart how human and machine agents interact to create collective and predictive intelligence.

Starting at process module 1, a question or desired piece of information, such as an important prediction of a future outcome, or the likelihood of an uncertain property of some system, or of an explanation of a particular scenario, or a quantitative value of some measurable unit, is posed for which an informed answer is desired. In one class of system the questions are related to the field of cybersecurity and include but are not limited to a scenario being caused by a particular type of attack such as a type of ransomware, or being related to a particular strain of malware or certain adversarial actors, or where a future or yet unknown step of a cyberattack targets a particular network asset or uses a particular method or exploits a particular vulnerability, any of which may render the system under attack to be compromised or to be at greater risk of some adverse outcome.

Each query corresponds to a node in a Bayesian probability network 8 that is dynamically constructed based on information which may be discovered by agents through the course of an investigation or observation, and such system is designed to compute the probabilities of the nodes, once such nodes exist, conditional upon the information introduced at that node and the probabilities of other nodes connected to it in causal relationships or non-causal correlations using Bayes Theorem. A probability is then assigned or voted on by an agent in module 2.

In some embodiments, the agent may also find a piece of evidence 3 to support their assignment decision at the same time. In some embodiments, this may occur at an unrelated time. The evidence from 3 is stored in an evidence library 4, and each piece of evidence is assigned an evolving reputation score 5. The evidence library may be designed with a citation feature that allows any agent to reuse the evidence submitted on a node in making a new input on the probability of the same node wherein the act of citing the evidence automatically records an up vote for the citing agent on the original record of the evidence.

The evidence from 3 or 4 is paired with the probability assignment from 2 in process 6. This pairing information is required by the system such that each actual input relating to an explicit change in the probability of a node by an agent must be supported by evidence captured and shared with other agents in the system. In one embodiment the evidence submitted is tagged with information that identifies it as having one or more properties related to cybersecurity ontologies that define concepts such as attack types, attacker methods, malware species, other software tools, adversary groups, indicators of compromise and vulnerabilities.

The information pairing from 6 is then used to construct or change a node in the Bayesian network, shown by process 7 into 8. The system may be designed such that agents other than the agent finding evidence on a node and submitting a change in the probability of the node can up vote or down vote the finding and implicitly the evidence that was submitted, and that these votes are recorded as fixed points transactions on the node, and are used as reputation scores for the evidence in which the agent and number of shares making the up/down vote are retained as meta on the evidence in perpetuity. This is shown in FIG. 1 by the path from process 7 to process 5. In one embodiment the agent submitting original evidence with a change of probability is automatically credited with an up vote.

In process 9, a "Market Scoring Rule" determines the points cost and payoff amount, or inputs can be entered by a simply "up-vote" or "down-vote" which are valued as a fixed number of shares in the absolute Yes or No outcome, as determined by the intended direction of the probability change the evidence is associated with, and for which the Market Scoring Rule converts into the correct price. The Market Scoring Rule is based on the mathematical model of the Differential Binomial Distribution equation which applies a consistent and fixed scale to compute the value of new information that is good or bad depending on the state of the node immediately prior to the contribution of the new information. The cost of entering a new input may be presented to an agent starting from module 1 so as to incentivize good judgements.

Once the market scoring rule has determined the points cost or payoff amount, the points data 10 and the agent activity data from 7 is sent to an account that tracks the agent's activities in the system and the number of points issued to the users that grows in size when the agent contributes information determined to have been good and drops when such information is bad, and all agents are conditioned by competitiveness or by program logic to maximize the number of points in their account.

The system thus described operates to make predictions on the nodes and outputs of the Bayesian information networks and works to incentivize agents to proactively invest in information that is not just consumed in a particular question but that which is reusable for new questions such as queries that might work again on problems.

It is possible for the system to aggregate at a massive scale from distributed experts or information systems, any of which may be connected to the system or not, that are providing quantitative data on figures-of-merit related to the system's relational information objects, such as rates of incidence, impact severities, indicators of methods of compromise or of the factors, costs, and methods of detecting or mitigating attacker methods or factors so as to use such data in performing calculations on cyber situational assessments.

The system may be equipped to collect quantitative data on such figures-of-merit through real-time human and machine interfaces into the system so as to retain up-to-date information on correlations, incidences, probabilities, impacts, risk severities, costs, detections, mitigations, and such other data as are relevant to cyber hunting, cyber risk decision making and situational assessments.

The specific embodiment of the above quantitative data collection wherein the interface with the information sources report on current aggregations of the values of the figures-of-merit and the reasoning behind inputs as a benefit of using the system and its related information relationships/structures/ontologies.

The additional method related to the quantitative data collection of the figures-of-merit that records each input from a source and later scores each input for accuracy to provide feedback to the source and increase or decrease the reputation score and influence of the source in providing future information.

Methods that use such data on the figures-of-merit to dynamically determine current probabilities and rates related to the figures-of-merit for use in predictive models of cyber hunting and situational assessment whereby the derived values are dependent on the inputs and learning from these and prior inputs and outputs of the information system.

The prior method with the specific embodiment whereby the predictive methodology uses a real-time dynamically constructed Bayesian inference network that connects the various attacker methods and factors together such that relevant current data on the figures-of-merit are gathered in a continuous fashion from informed sources and are available to inform any and all interactions with the system.

The prior method with the additional specific embodiment whereby the system implements rules based on conditions it monitors to automatically construct relationships relevant to context of the data at hand, such as invoking methods and/or factors from a library or establishing relationships between the same and values for the figures-of-merit, in order to give guidance or provide predictive information on attack hunting, investigative or operational priorities and situational risk assessment to users through its interfaces.

Computational methods that autonomously orchestrate collaborative cyberattack investigations and recommendations on remediations by the system using its own model, and its autonomous capabilities to make connections between attacker methods and factors and to assess contextual priorities such as probability of compromise or other specific outcome, presence of a particular threat or estimated severity of an impact of a given situation including the current status of an investigation from evolving.

In some embodiments, methods that use the system to predict diminishing returns from continued analysis to reach closure on and suspend continued efforts at minimizing residual uncertainty in the possible outcomes or risks.

In some embodiments, methods that use the system's Bayesian framework in concert with "game theory" and "game theoretics" methods to predict attack progression and intent through the evaluation of expected value of outcomes.

In some embodiments, a method by which previously known cyberattack events can be entered into the system to enable analysis and use in the cyberthreat library that can be available to analysts and such library can be augmented through curation, tagging and assignment of the machine learning (or other analytic tools) that can allow for automated comparisons in the means of attack, successful methods of remediation. Such algorithms can perform pattern matching of source code, sequence of attack, and other signals associated with a cyberattack event so as to offer additional insight into the operation of the code, potential methods of defeating its' operation, anticipated progression and involvement with operating system or specific application components, as well as classification of the attack into a taxonomy that is meaningful to the analyst (e.g., classification and details surrounding classifications such as: malware, phishing, man-in-the-middle attack, denial of-service, SQL injection, zero-day exploit, DNS tunneling, and many other known classifications or combinations thereof).

In some embodiments, methods that use the system's information management utilities in analytical cases to provide real time training inputs for cyber analytics Artificial Intelligence models including but not limited to attack identification, intent and impact prediction and adversary attribution.

V. Orchestrating a Defense to Events and Incidents

In some embodiments, a system exists that is designed to facilitate analysis by humans and analytical technologies of cybersecurity events or incidents.

In one embodiment this system serves to create a community of analysts wherein such community may further be embodied partially as a community of cybersecurity analysts that may contain independent analysts seeking free-lance work based on their skills and work experiences.

In another embodiment the community of analysts may include companies that seek work responding to events or incidents as an entity with particular capabilities. The benefits of such engagements include incremental revenue to the members of the community and new ongoing business relationships.

The system further is designed to host investigations into many events and incidents and to support investigations of cyberattacks at significant volumes, in such a manner as to provide users an environment where cyber analysis of known real-world events and incidents can be performed and judged at scale.

In one embodiment such a system may be implemented in cloud-based online infrastructure for access by users with only an internet connection and standard browser.

In one embodiment, the system may provide capabilities to facilitate collaboration between the users and sharing of specific insights related to answering questions. In a further embodiment such system is used to train and share insights by cyber analysts in current or emergent threats and attacks.

The system may also be equipped with capabilities to classify cyber threats and attacks in terms that are recognized universally by those knowledgeable in the art and by developers of other cybersecurity technology systems.

Some embodiments may allow for external systems to access and integrate with its modeling tools that enable external entities to seek insights from the system including querying its records via the classifiers for recommendations of work products that might explain or resolve suspected threats, events or incidents, or that might identify expertise to engage for such purpose.

The system facilitates discovery of the matching work products by way of easy-to-understand visualizations and information on effectiveness ratings, track record and on how the work product and any related talent can be acquired, tested, and licensed or purchased.

FIG. 3 is a process chart describing a system for the rapid matching of cybersecurity talent and methods to events or incidents upon demand.

The process starts when a threat, event, or incident is submitted to the system in module 34. An event or incident may include, but not be limited to, an anomaly or vulnerability detected in a computer or a computer network or other collection of devices or computational resources that is potentially indicative of an unwanted intrusion or attempt to access, disrupt or misuse the systems being monitored, a suspected threat such as a potential phishing communication or link that may lead to unauthorized access to user information or to computers being infected with malicious software called "malware", or a security incident already recognized as being underway and likely to be caused by unwanted access or an attempted cyberattack such as ransomware.

Then, in module 35, various toolsets are used to classify cyber threats and attacks in terms that are recognized universally by those knowledgeable in the art and by developers of other cybersecurity technology systems.

In one embodiment malicious software known as malware are detected and classified by anti-virus technologies by matching the code to specific programming techniques called signatures of particular malware species.

In another embodiment Indicators of Compromise (IOCs) are found and classified, which are records a threat or intrusion leaves behind, or metadata exposed by the threat itself or exposed as it performs its functions, that are intrinsically indicative of an abnormal condition or that have been reported already to be malicious by some authoritative source(s).

In another embodiment systems or technologies identify and classify computer vulnerabilities in a naming convention that contains knowledge of the vulnerability, its risks and how to mitigate it.

In another embodiment the system enables and supports classifying threats and attacks by identifiable techniques used by malicious actors, and a specific sub-embodiment of this type commonly used in the field of cybersecurity is the tactics, techniques, procedures (TTPs), software, adversary groups, detections and mitigations contained within the MITRE Corporation ATT&CK framework.

In another embodiment, names of cyberattack types or campaigns known to those expert in the art, and classes of attacks such as ransomware and software supply chain, are used to classify threats, events and incidents. In another embodiment frameworks and conventional descriptors are used to classify the targets and risks of cyberattacks such as accepted names of network assets and risk frameworks like from the National Institutes of Standards and Technology (NIST).

The tools may also be used to create models of threat, event or incident using the conventions described above. As an investigation unfolds the specific classifiers, detection methods, responses and/or mitigations associated with the specific threat, event or incident are captured, recorded and made available for retrieval later through the novel system. Users of the system may also use its tools to capture models of threats or attacks of interest, such as a strain of ransomware, with specific classifiers and methods as generic products of their work.

The classifications or other work products, shown in module 36, are sent to a database that stores all work products 37. Every work product submitted to the database is tracked and scored for effectiveness at macroscopic levels and down to the level of specific classifier entities in process 38. This process is executed continuously, and the scores are constantly updated, shown by the path from process 38 back to the database 37.

In one embodiment the effectiveness of detection and mitigation methods of specific TTPs is scored by various methods facilitated by the system and all methods for a specific TTP known by the system are available along with the work product's methods. When the system receives an external query 40 to seek insights from the system, the query gets sent to a matching process 41. An external query to the system may include but not be limited to querying its records via the classifiers for recommendations of work products that might explain or resolve suspected threats, events or incidents, or that might identify expertise to engage for such purpose.

The matching process 41 also takes the work product scores and other work product information from 39 and uses various integration processes to match the work products to the external queries. In one specific embodiment these integration capabilities are accessed via an Application Programming Interface (API) with "stringified" key-value paired query terms that the novel system uses to find explicit and predicted matching patterns, or graphs, with those of recorded work products and those with similar information from open online information sources.

The system further makes the degree-of-fit evident graphically and through recommendation scores to the requesting system or user. In one embodiment the recommendation scoring is informed by the scoring method described in 38. In another embodiment the system facilitates manual entry of classifiers into a user interface that iteratively reports matches, degrees-of-fit and effectiveness scores graphically and quantitatively.

The matching process 41 may display easy-to-understand visualizations and information on effectiveness ratings or track record of the work products or the creators of the work products and on how the work product and any related talent can be acquired, tested, and licensed or purchased, which is shown by the display module 42.

Sources of talent may include but not be limited to a single human skilled in cybersecurity analysis, a group of humans skilled in cybersecurity analysis working together, or a company with humans skilled in cybersecurity analysis offered through the company.

In some embodiments, matching process may include visualizations and information with a monetary offer as seen in 43, which would be delivered to the client through the system interface. Furthermore, system settings control transactions at the point of sale to enforce the rights of the provider of the system or the creators of the work product.

In one embodiment work products are a collection of methods the creators have found to be useful in analyzing and responding to the TTPs, malware and type of adversary expected, and the creators offer their products in return for royalties that are paid them through the system.

In another embodiment, the work products may initially restrict access to the methods they contain but permit an interested party to run a containerized computer script that ingests artifacts and responds with a confidence scorecard to estimate the probabilities of impacts from the selected work product before the purchase is made.

In another embodiment, the novel system may utilize a collective intelligence Bayes Net technology that connects methods and presence of IOCs to TTPs and adversarial software to model the confidence of fit and the likelihood of macroscopic impacts based on up-to-date observational data.

If the customer does not accept the transaction offer, they can either end the process or make a separate query.

If the customer accepts the transaction, they are sent to module 45, where the system facilitates the use and understanding of the work products and their results through APIs and information tied specifically to the work product.

In one embodiment, the system may allow the expert creators of the work products, or their approved agents, to privately interact collaboratively and seamlessly with the organization that has observed the threat, event or incident once the work product is purchased by access to a case created on the system for this purpose. Such a case controls access to the work it manages by explicit invitation to authorized users/agents and makes the progress on the case immediately available to all invited users. Connectors to machine agents access their findings seamlessly. Settings on each case control how data artifacts will be uploaded when needed for sharing. Certain settings in each case anonymize identifying information contained within the artifacts as they are uploaded such as IP addresses and MAC addresses while preserving the utility of the information in tools.

The system may also feature skill-rated and vetted analysts or micro-engines available on-demand through the system over API based on the specific threat or method in need of support.

The system may also feature automated routing of threats and events selectively to decentralized on-demand resources based on analyst or micro-engine skill-ratings and client authorizations.

Embodiments mentioned in this section are designed to aid organizations needing expert help on cyber threats, events and incidents, regardless of size or sophistication, can find high confidence answers to their challenges rapidly and on-demand and interact fluidly directly with experts they trust. Individuals, teams of individuals and companies wanting to promote and profit from their expertise in specific problems such as new types of attacks can be found and engaged efficiently and remotely by organizations at the time and in the exact threat context of need.

VI. Incentivization of Agents of the System with Digital Assets

Some embodiments relate to incentivization of human and machine users to search for cyber threats and breaches in data sets, or in target systems, and to report on their evidentiary confidence of the information in the stated finding, by using a normalized metric.

Starting at the work product database 37, work products are taken from the work product database and may be formatted as encrypted containers in process 46. The work products themselves may include a means to make a probabilistic determination or prediction that summarizes the work product's core answer or insight on the threat or incident it is designed to analyze in terms of its likelihood. For example, the core insight might make the statement "This threat signature is a ransomware attack", and the determination is the confidence this statement is true.

The prediction can be calculated by submitting certain data to the system that the work product entity requires and processes. A customer considering purchasing or using the work product may provide it the data to generate the prediction. The value of this prediction may be used to decide whether to purchase the full work product including any methods and data such as unique intelligence relevant to the analysis. When the work product is formatted in process 46, they are designed as encrypted containers to restrict access to some or all of the information they contain, producing the result 47.

Decryption is designed to require a token provided by the system to the customer upon purchase. The encrypted work product may be built in blockchain technology with a "smart contract" feature that manages the total transaction immutably within a decentralized ecosystem of stakeholders in the system's information work, illustrated as the path from module 47 to process 48, and in one sub-embodiment the entity has the form of a Non-Fungible Token (NFT) priced in crypto currency or other digital representation of monetary instrument, that the creator of the work products, and only that creator, can reproduce or mint. The encrypted containers themselves, whether or not they have been built with blockchain technology, can then be entered into an exchange market 49.

Upon purchase of the encrypted work products, the system may distribute a royalty payment to the creator of the work products, and it makes other monetary distributions to the marketplace host and other stakeholders in the work products, illustrated by module 50, which shows digital currency entering the exchange market.

Further, it makes changes and entries in the system to record the transaction and may record certain other settings such as applicable rates, to prepare for subsequent purchases enabled by the work products. In one embodiment the subsequent purchases include analysts authorized by the work product to participate in the case the work product creates, and the settings recorded include compensation rates.

The exchange market can also incorporate points 51 retrieved by a user from their points account included in the points and activity database 11. Any other relevant form of currency is contained within module 50. Points can also be used within an internal ecosystem market to obtain benefits such as recognition of expertise 53, access to special questions with high monetary or other value 54, or other items internal to the system that have value 55.

The points 51 may also form the basis of a new class of crypto currency based upon the value of intellectual work unfettered by organizational filters that rewards for positive contributions to human knowledge in any domain of knowledge where removing uncertainty is valued.

The system may also feature incentives to reward cyber hunting and analysis based on the value of information provided for cyber breaches or live cyber threats in networks or in the data of aggregated entities.

The incentivization of agents may occur in any form, including but not limited to; ACH payment, personal check, digital tokens that are tradeable on the exchange market provided by the platform, NFTs that can be minted on the blockchain through smart contracts that allow agents to be rewarded on their success of identifying and fighting cyber threats.

It may also be possible for the system to permit collaboration by multiple users all engaged in the identification of different pieces of information contributing to the overall findings such that each piece of information retains its marginal value and can be settled with the information providers at the conclusion of each case or as the information is encapsulated and transferred or shared with others through a transaction enabled by the system.

In some embodiments, there may also be a time limit established by the system on any level of information to be supplied for it to be accepted, exchanged, and monetized.

In some embodiments, the system may place specific bounty values in a currency denomination for the desired definitive information.

In one embodiment the encrypted containers for the information exchange is built in blockchain technology with a "smart contract" feature that manages the total transaction immutably within a decentralized ecosystem of stakeholders in the system's information work, and in one sub-embodiment the entity has the form of a Non-Fungible Token (NFT) priced in crypto currency or other digital representation of monetary instrument, that the creator of the work products, and only that creator, can reproduce or mint.

The platform features a novel monetizable incentive model to reward individual contributions as independent analysts and as contributors to teams discovering threats like ransomware campaigns based on the value of the information given.

This means that a user, or artificial intellect, can earn more reward for producing information that takes more risk or uncertainty out of situations that have the most value or importance. The organizing construct is the concept of maximizing the expected value from the opportunities and information available in a marketplace of questions needing answers where the final value of each input is computed as a product of the price the market will pay for perfect information on the issue at hand and the fraction of uncertainty space correctly or incorrectly claimed at the time of input based on present knowledge. Inputs that correctly claim relatively more uncertainty space capture (gain) a greater proportion of this fractional multiplier of the total marketable value for perfect information. Inputs that correctly claim less will gain less. Inputs that claim changes in uncertainty that are incorrect will lose value. This incentive model is designed to overcome barriers to speed and talent availability that exist today in hunting live threats and so has high value in cybersecurity where speed of threat detection is directly related to expected losses and where talent is in short supply. Once found, information on threats such as ransomware in the wild is highly monetizable as a proactive warning and mitigation playbook.

The platform can distribute this information to customers, and marketize it through an asset marketplace to sell it to risk stakeholders, risk investors, cybersecurity technology and services companies and to enterprises of all sizes for premium prices. The people or machines that provide the insights are rewarded for this IP based on the measurable contribution of information value they provided. This novel model promotes growth of the threat library organically to feature a plurality of novel defense mechanisms by the various agents of the system.

The collective invention thus described creates a marketplace of a new class of intellectual work products where consumers of cybersecurity services needing effective expert help and methods to solve problems and questions of cyber threats both proactively and reactively can find and consume creator-driven, utility-rated solutions developed and offered by experts via any form of organization, from individuals to corporations, in return for fair economic incentives contracted and managed with smart immutable contracts enabled by tokenized encryption technology and settled monetarily through decentralized transactions in digital currencies. This allows a real-time incentivized market enabling researchers to hunt cyberspace continuously for new threats such as new ransomware campaigns analogous to "Zero Day' vulnerabilities in operating systems and encapsulate their own novel detection and mitigation methods for distribution to consumers of their work products utilizing technologies commonly available to information security workers.

VII. Other Embodiments

The platform may allow anonymization of event log files and PCAP (PCAP is an application programming interface (API) for capturing network traffic) files and other network traffic datasets through a flexible data normalization and transformation technology platform. The application ingests PCAP and log files and anonymizes IP and MAC Addresses, and other fields that have identifying information into like formats of consistent values across file types using a passphrase-keyed crypto block algorithm to preserve data formats, network topologies and similar metadata within the transform.

In the case of PCAPs where the complexity of packets make direct anonymization problematic, the platform may produce anonymized extracts analogous to the common NetFlow digest or the protocol log structure of Bro/Zeek used by many analytics developers and independent analysts, and for endpoint security data; the platform may also support proprietary messaging data schemas and the OSQuery toolset.

The system may also preserve the data formats and analytical value of transformed data, including whitelist/blacklist items, to retain the utility of tools and methods that need these formats and certain published values (e.g., bad IP addresses) to be useful.

The platform may not require the cyber event input data to be well-structured; rather, it recognizes data to process by word-structure, such as all data conforming to an IPv4 format, and by semantic meaning, such as username, and it anonymizes them wherever they are encountered. The threat data and its corresponding analysis is extensible to any word format, or semantic classification schema (including all natural-language processing libraries) that can be processed in memory.

The system may be equipped to anonymize data from networks and endpoints without loss of analytical information to share with decentralized analysts and analyze without disclosing the source whereby such transforms can be reversed to re-identify findings communicated against anonymized network entities for the network owner to associate with the specific real endpoints and appliances privately and securely.

It may also be possible for the system to permit collaboration by multiple users all engaged in the identification of different pieces of information contributing to the overall findings such that each piece of information retains its marginal value and can be settled with the information providers at the conclusion of each case.

There may also be a time limit on any level of information requested from the system.

A further method to the above methods that places specific "bounty" values in a currency denomination for the desired definitive information.

Some embodiments may include but may not require gamification to aggregate and granularly score the skills, experiences and performance of analysts and micro-engines alike at identifying, hunting, investigating related intelligence information and identifying solutions to mitigate attacker methods, software, adversary groups, playbooks and campaigns.

Some embodiments may allow agents of the system to create, syndicate and offer Collaborative Hunt Playbooks commercially that are designed to hunt specific attacker campaigns and inform response actions through a combination of specified expert hunters, micro-analytics and methods that non-experts can use to facilitate such Collaborative Hunt.

Following an initial threat detection, the above method may allow implementation of systematic playbooks to provide proactive ransomware hunting.

In some embodiments, proactive hunt micro engines may detect and indicate the probability of particular attacker techniques or threats such as particular playbooks or attacker campaigns where such micro engines analyze endpoints or the consolidated logs of networks of endpoints and network appliances and where the methods encrypt the findings in such a way that the findings are decrypted by purchase of a key.

Some embodiments may feature translation of human input in the system; including but not limited to analytical findings into machine-understandable information to promote machine collaboration with human users.

Some embodiments may feature methods to anonymize data from networks and endpoints without loss of analytical information to share with decentralized analysts and analyze without disclosing the source whereby such transforms can be reversed to re-identify findings communicated against anonymized network entities for the network owner to associate with the specific real endpoints and appliances privately and securely.

In some embodiments, the platform may enable cyber analyst "co-pilot training" by mirroring real or simulated event data and session data from experts engaged simultaneously in events to analysts-in-training where such trainees can work directly in the event data and see high level findings of experts without the benefit of seeing the experts' evidence, thus leading the trainees to follow the footsteps of the experts in solving cases to complete training assignments.

The added embodiment to the above wherein the analysts-in-training may contribute unidirectionally into a real or simulated event, but only see the partial information of other users and whereby the analysts-in-training are measured and rated comparatively to experts and other users in terms of time and value of information.

In some embodiments the system is implemented to access users anywhere in the world where internet accessible infrastructure is available with all ratings and information on analysts' background and capabilities to enable decentralized on-demand access for companies to analysts.

Some embodiments may feature methods for lawful organizational access limitations to agents based on conflicting backgrounds or ratings.

The system may provide the capability to minimize the threat of a "Bad Actor" who may be providing deliberately deceiving information or using the system to understand target infrastructure using a software and rules-based systemic approach. To mitigate this possibility, the system is equipped with four layers of protections and mitigations built into the platform against this risk. The first layer of protection is that access to every piece of information in the platform requires a role to which a user must first be assigned that must be applied by the system through an automated process or by an administrator. Users can be added or removed from a case or a specific piece of information. Second is that the cases that are used to manage hunt and response problems have privacy settings that, when chosen, instruct the platform to anonymize and encrypt data upon ingest before it is shared with a group. The anonymization is done in such a way that network topologies are preserved and other fields that tools require to be in a specific format stay in that format after anonymization. The admin however retains a translated view of the data in its original form so as to interpret the findings back to the actual network and business. The third protection is that the system captures the reputational background of users, such as known sourcing partners, employer partners, or from vetting services. The final protection is that all transactions in the system affect the ability of a user to have an impact on a question and are seen by the other users that have access to the questions. When bad information is provided these others are incentivized to correct it. The effect of this is that a deceitful user will cede their influence to other users and not only shine a light on themselves as "pattern contrarians or fraudsters" but also marginalize themselves from having an effect on the decision outcomes.

The system provides a novel method to crowdsource cyber analysts. The platform extracts and makes accessible, the essence of an expert's expertise, such as how to search for or mitigate a particular adversary method. These methods can be syndicated and made available widely when a case needs their input. Moreover, they can be distributed in data products that only reveal their full content after a token is purchased to unlock the protected content. This elevates crowdsourcing to the domain of experts by making their work-products the unit of sharing, not just their live participation, and gives them an incentive to become content co-creators and answer providers in the platform. Because they can do this anonymously, they can realize income for their individual talents. And because every action available in our system is accessed through a simple REST API, every cyber pro with a webserver, python skills and an API key can share in exchanges available in the system.

The platform may allow analysts to access threat library and plurality of cyber threats, some portion of which may potentially have never been observed by security analysts or systems before, or, in a case where a particular system or network is being monitored for threats, the threats include ones that are new to this context.

What is claimed is:

1. A processor based system for addressing threats that are harmful to computer systems of users, the system being usable with a community of assessment and mitigation agents upon detection of the threats, the threats including a newly detected threat and previously detected threats, the system performing steps comprising:
- classifying the detected threats based on aspects of the newly detected threat that are similar to the previously detected threats;
- categorizing the classified, newly detected threat based on assessed techniques for analyzing and mitigating the classified, newly detected threat;
- storing the categorized, classified, newly detected threats to threat library;
- enabling the community of assessment and mitigation agents to access the stored, categorized, classified, newly detected threat and to provide analytics and mitigation information for analyzing and mitigating the categorized, classified, newly detected threat;
- determining relevancy of the provided analytics and mitigation information to assign a relative skill level rating of the assessment and mitigation agents; and
- identifying at least one of the mitigation agents most capable of handling the newly detected threat, based on the assigned skill level, wherein the step of storing a categorized, classified, newly detected threat can occur in Non-Fungible Toke format of a similar blockchain enabled digital instrument on a decentralized server with a smart contract which enables the threat and relevant mitigation technique information to be purchased.

2. The system of claim 1, wherein the step of classifying the newly detected threat further includes classification matching the newly detected threats human skills and analytical tools that may be required to fully detect the threat's infiltration, to remediate or to manage the threat.

3. The system of claim 2, wherein the step of classifying the newly detected threat further includes classification matching to a previously stored threat to and relevant analytics and mitigation techniques relevant to the newly detected threat.

4. The system of claim 3, wherein the step of classifying the newly detected threat further includes classifying newly detected threats with respect to its carriers, payload, event information with details from a standardized ontology.

5. The system of claim 4, wherein the step of classifying a newly detected threat further includes creation and curation of nodes in an information model representing the threat that are based on the standardized ontology, describing a newly detected threat's components and outcomes.

6. The system of claim 5, wherein nodes are connected in a Bayesian network that predicts and estimates information contained within the network.

7. The system of claim 6, wherein the step of classifying the newly detected threat further includes utilizing the system's stored analytics and mitigation information to stop the progression of a threat.

8. The system of claim 5, wherein the step of classifying the newly detected threat further includes utilizing the system's stored analytics and mitigation information to hypothecate on alternative scenarios relating to the prosecution of a threat.

9. The system of claim 8, wherein the step of classifying the newly detected threat further includes utilizing the system's stored analytics and mitigation information to forecast the progression of a threat.

10. The system of claim 9, wherein the step of classifying the newly detected threat further includes utilizing the system's stored analytics and mitigation information to hypothecate on alternative scenarios relating to the prosecution of a threat.

11. The system of claim 10, where in the step of classifying the newly detected threat further includes forecasting the progression of a threat by a graph-based interactive algorithm and data visualization to interactively guide classification of threats by exploring matches of emerging findings and hypothetical variations represented as sets of nodes with models from previously detected threats and correlations between nodes from threat library to recommend lines of analysis regarding the newly detected threat.

12. The system of claim 11, where in the step of classifying the newly detected threat further includes hypothecation of feasible scenarios of a threat by a graph-based interactive algorithm and data visualization to interactively guide classification of threats by exploring matches of emerging findings and hypothetical variations represented as sets of nodes with models from previously detected threats and correlations between nodes from threat library to recommend lines of analysis regarding the newly detected threat.

13. The system of claim 12, wherein the step of hypothecating feasible scenarios of a threat includes utilizing historical data collected from mitigation and assessment information provided by mitigation and assessment agents.

14. The system of claim 1, wherein each storage of a threat in NFT format or similar blockchain enabled digital instrument on a decentralized server with a smart contract enables marketplace members to own shares in the information and its derivatives that yield dividends or other payouts as it is subsequently sold.

15. The system of claim 1, wherein the categorization of a newly detected, classified threat further includes transmitting an interactive graph-based report by the system that guides in categorization and analysis of threats.

16. A processor based system for addressing threats that are harmful to computer systems of users, the system being usable with a community of assessment and mitigation agents upon detection of the threats, the threats including a newly detected threat and previously detected threats, the system performing steps comprising:
- classifying th e detected threats based on aspects of the newly detected threat that are similar to the previously detected threats;
- categorizing the classified, newly detected threat based on assessed techniques for analyzing and mitigating the classified, newly detected threat;
- storing the categorized, classified, newly detected threats to threat library;
- enabling the community of assessment and mitigation agents to access the stored, categorized, classified, newly detected threat and to provide analytics and mitigation information for analyzing and mitigating the categorized, classified, newly detected threat;
- determining relevancy of the provided analytics and mitigation information to assign a relative skill level rating of the assessment and mitigation agents;
- identifying at least one of the mitigation agents most capable of handling the newly detected threat, based on the assigned skill level, and
- issuing a new class of crypto currency whose units are minted through intellectual work that provides information having the recognizable value of removing uncertainty in any domain of knowledge in which removing uncertainty is valued.

17. The system of claim 1, wherein the step of enabling the community of assessment and mitigation agents to access threats includes automating private access to appropriate resources remotely and rapidly to implement the analytics and mitigation entities on a newly detected threat.

18. The system of claim 1, wherein the step of determining relevancy of the provided analytics and mitigation information to assign a relative skill level rating of the assessment and mitigation agents further includes scoring mitigation and assessment agents based on the novelty of the information they provide wherein the value of the information is determined by its utility as judged by a marketplace of users of the system.

19. The system of claim 18, wherein the step of determining the relevancy of information provided by mitigation and assessment agents further includes scoring of the information provided and its source using a Brier scoring algorithm that considers the novelty of the threat the mitigation agent is mitigating.

* * * * *